United States Patent
Corbin et al.

(10) Patent No.: US 7,678,350 B2
(45) Date of Patent: Mar. 16, 2010

(54) PROCESSES FOR PRODUCING TITANIUM DIOXIDE

(75) Inventors: David Richard Corbin, West Chester, PA (US); Scott N. Hutchison, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/186,881

(22) Filed: Aug. 6, 2008

(65) Prior Publication Data

US 2010/0034714 A1    Feb. 11, 2010

(51) Int. Cl.
*C01G 23/047*    (2006.01)
(52) U.S. Cl. .............................. 423/81; 423/85; 423/143
(58) Field of Classification Search ................... 423/81, 423/85, 143
See application file for complete search history.

(56) References Cited

U.S. PATENT DOCUMENTS

2008/0156229 A1*  7/2008  Corbin et al. ............... 106/442
2008/0159933 A1*  7/2008  Corbin et al. ................. 423/86

OTHER PUBLICATIONS

Battle et al., The Processing of Titanium-Containing Ores, The Minerals, Metals and Materials Society, 1993, pp. 925-943.
Dumon et al., Action of Various Organic Acids on a Titanium Mineral—Comparison of Their Titanium Extracting Power Versus Inorganic Acids, Bull. Inst. Geol. Bassin Aquitaine, 1975, vol. 17:95-100.
J. C. Dumon et al., Evidence for a Certain Mobility of Titanium in the Podzols as Well as in the Laboratory Under the Influence of Organic Agents, Phys. Chem. Earth, 1977, vol. 11:331-337.
J. Barksdale, Titanium: Its Occurrence, Chemistry and Technology, 2nd Edition, 1966, Ronald Press (Book Not Included).
U. Schwertmann et al., Wiley VCH, 2nd Edition, 2003, Weinheim (Book Not Included).

* cited by examiner

*Primary Examiner*—Steven Bos
(74) *Attorney, Agent, or Firm*—Gail D. Tanzer

(57) ABSTRACT

Provided are processes for the production of titanium dioxide from ilmenite. In these processes, ilmenite is digested with aqueous trimethylammonium hydrogen oxalate. Iron from the ilmenite precipitates as a hydrated iron oxalate and is removed by filtering, leaving a titanium-rich solution. The titanium-rich solution can be further processed to form titanium dioxide.

15 Claims, 1 Drawing Sheet

PROCESSES FOR PRODUCING TITANIUM DIOXIDE

FIELD OF THE INVENTION

The present invention relates to processes for the production of titanium dioxide from ilmenite.

BACKGROUND

Titanium dioxide is used as a white pigment in paints, plastics, paper, and specialty applications. Ilmenite is a naturally occurring mineral containing both titanium and iron with the chemical formula $FeTiO_3$.

Two major processes are currently used to produce $TiO_2$ pigment—the sulfate process as described in "Haddeland, G. E. and Morikawa, S., "Titanium Dioxide Pigment", SRI international Report #117" and the chloride process as described in "Battle, T. P., Nguygen, D., and Reeves, J. W., The Paul E. Queneau International Symposium on Extractive Metallurgy of Copper, Nickel and Cobalt, Volume I: Fundamental Aspects, Reddy, R. G. and Weizenbach, R. N. eds., The Minerals, Metals and Materials Society, 1993, pp. 925-943". Dumon et al (Dumon, J. C., Bull. Inst. Geol. Bassin Aquitaine, 1975, 17, 95-100 and Dumon, J. C., and Vigneaux, M., Phys. Chem. Earth 1977, 11, 331-337) describe the extraction of ilmenite with organic and mineral acids.

The present invention provides new processes for $TiO_2$ production with the ability to use low grade ores that are less energy intensive, that require reduced capital investment and that have a smaller environmental footprint than conventional current production processes.

SUMMARY OF THE INVENTION

Figure 1:
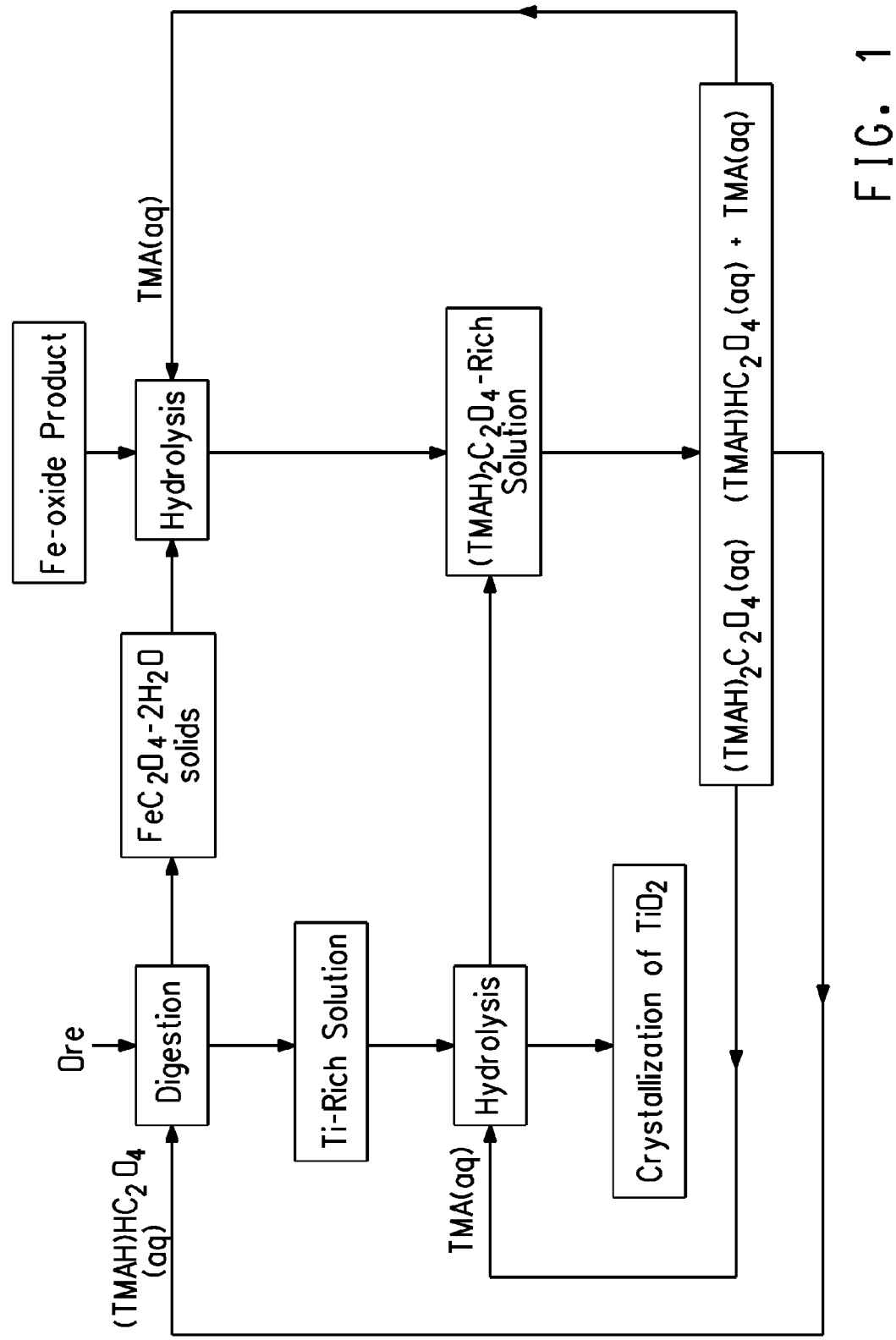
FIG. 1 is a process flow diagram of a process according to one embodiment of the present invention for making titanium dioxide.

One aspect of the present invention is a process comprising:
a) digesting ilmenite ore with aqueous trimethylammonium hydrogen oxalate to form a leachate and an iron-rich precipitate;
b) separating said leachate from said iron-rich precipitate;
c) hydrolyzing said leachate with trimethylamine to form titanyl hydroxide and an oxalate-rich solution;
d) separating said titanyl hydroxide from said oxalate-rich solution;
e) washing said titanyl hydroxide with a material selected from the group consisting of water, aqueous trimethylammonium oxalate and aqueous trimethylamine, to form low oxalate titanyl hydroxide; and
f) crystallizing titanium dioxide from said low oxalate titanyl hydroxide.

Another aspect of the present invention is a process comprising:
a) digesting ilmenite ore with aqueous trimethylammonium hydrogen oxalate to form a first leachate and an iron-rich precipitate;
b) separating said first leachate from said iron-rich precipitate;
c) optionally, adding a reducing agent to said first leachate to form a second iron-rich precipitate and a second leachate and separating said second iron-rich precipitate from said second leachate;
d) hydrothermally crystallizing said first or second leachate in an autoclave for a period of 1 hour to 24 hours to form titanium dioxide and a hydrothermally treated solution; and
e) separating said titanium dioxide from said hydrothermally treated solution.

A further aspect of the present invention is a process comprising:
a) digesting ilmenite ore with aqueous trimethylammonium hydrogen oxalate to form a leachate and an iron-rich precipitate;
b) separating said leachate from said iron-rich precipitate;
c) adding a reducing agent to said leachate to form an iron-rich precipitate and a reduced leachate;
d) separating said second iron-rich precipitate from said reduced leachate;
e) hydrolyzing said reduced leachate with aqueous trimethylamine to form titanyl hydroxide; and
f) hydrothermally crystallizing said titanyl hydroxide to form titanium dioxide and a di-trimethylammonium oxalate solution.

DETAILED DESCRIPTION

In the processes disclosed herein, ilmenite is digested by exposure to aqueous trimethylammonium hydrogen oxalate. Trimethylammonium is defined as three methyl groups and one hydrogen bound to a nitrogen atom. The processes include digesting ilmenite with trimethylammonium hydrogen oxalate. This forms an iron-rich precipitate and a titanium-rich solution, which can be separated. A variety of further processing steps can lead to the production of titanium dioxide. In some embodiments, oxalate in process streams can be recycled into trimethylammonium hydrogen oxalate for further digestion. A schematic of one embodiment of the present invention is shown as FIG. 1.

Ore is digested in the first step of the process. Digestion yields an iron-rich solid and a titanium-rich solution. The titanium-rich solution is hydrolyzed and the resulting solution is crystallized into titanium dioxide. The iron-rich solid can be hydrolyzed to form an iron oxide. Aqueous di-trimethylammonium oxalate can be collected from several process steps. The aqueous di-trimethylammonium oxalate can be heated to give aqueous trimethylammonium hydrogen oxalate and aqueous trimethylamine which can be recycled to earlier process steps.

As used herein with regard to embodiments of the present invention, the term "ilmenite ore" refers to iron titanate with a titanium dioxide content ranging from 35 to 75% by weight. The chemical composition of natural ilmenite ore can vary. It is commonly understood to be ferrous titanate with the formula $FeTiO_3$. The iron proportions can be higher than the theoretical composition due to admixed hematite or magnetite. An excess of titanium may be present, due to the presence of rutile. The processes of the present invention can be used for ilmenites with titanium dioxide content on the lower end of the ilmenite range. A titanium dioxide content of 35 to 60% by weight is preferred and a content of 45 to 55% by weight is most preferred.

The particle size of the ilmenite is preferably in the range of less than 1 to 300 microns for rapid dissolution, with 95% or more of the particles below ~100 microns. Smaller sized ore particles (<~140 mesh) can be used in this process and may provide an advantage over the known sulfate and chloride processes. These smaller particles are not preferred for use in prior sulfate or chloride processes. The concentration of the trimethylammonium hydrogen oxalate is necessarily 5 to 10 molal.

The digestion reaction may be conducted in one of three different chemical environments—non-oxidative, oxidative, or reductive. All digestion reaction environments contain aqueous trimethylammonium hydrogen oxalate. The ratio of trimethylammonium to hydrogen in the aqueous trimethylammonium hydrogen oxalate may vary. The digestions may be conducted in aqueous trimethylammonium hydrogen oxalate where the trimethylammonium to hydrogen ratio is up to and including 1.5 to 1.

For non-oxidative digestion, the ilmenite is contacted with aqueous trimethylammonium hydrogen oxalate while under an atmosphere of an inert gas such as nitrogen. Other suitable inert gasses include helium and argon. Digestion under inert gas inhibits the oxidation of iron ions in solution. The molar ratio of trimethylammonium hydrogen oxalate to ilmenite ore is 4:1 to 8:1 (on the basis of hydrogen in the trimethylammonium hydrogen oxalate to ilmenite ratio) for digestion performed in an inert atmosphere. A mixture is formed of the ilmenite and aqueous trimethylammonium hydrogen oxalate. This mixture is held under reflux conditions at a temperature of about 100° C. to 140° C. until most of the ore, e.g., at least about 70%, preferably at least about 90%, in some embodiments substantially all, of the ore is dissolved. Under these preferred conditions, dissolution of the ilmenite in the aqueous trimethylammonium hydrogen oxalate occurs at a rate such that generally about 70 to 90 percent of the titanium in the ore is dissolved within about 8 hours. While dissolution can be carried out for longer than 8 hours, it may not be desirable to do so, or advantageous in terms of cost. The iron(II) in solution precipitates as $FeC_2O_4.2H_2O$ leaving a titanium-rich solution. A titanium-rich solution is one in which the molar ratio of Ti/(Fe+Ti) in the solution is greater than that present in the ilmenite ore used; e.g., a ratio of 50.1:100 or greater for an ideal $FeTiO_3$. It is preferred that the amount of iron in the leachate is minimized. An iron-rich precipitate is one in which the molar ratio of Ti/(Fe+Ti) in the solution is less than that present in the ilmenite ore used. The precipitate contains $FeC_2O_4.2H_2O$. The solids from this digestion step can also contain unreacted ilmenite ore and its accompanying impurities (e.g., quartz, zircon, rutile, anatase, other iron titanates, monazite, etc). In addition, other very insoluble metal oxalates can be present (e.g., magnesium oxalate, calcium oxalate, etc.).

Non-oxidative digestion can be carried out in the presence of a reducing agent in addition to the trimethylammonium hydrogen oxalate. The reducing agent can be, for example, Fe(0), Zn(0), Ti(III), or Al(0). Iron metal is preferred. Treating with a reducing agent desirably converts substantially all of the Fe(III) present, which is highly soluble in the aqueous trimethylammonium hydrogen oxalate, to Fe(II), which precipitates as $FeC_2O_4.2H_2O$, further increasing the Ti/(Ti+Fe) ratio of the solution. The solution can then be diluted to about 1 wt % Ti as determined by ICP (inductively coupled plasma spectrometry) or equivalent chemical analysis technique. The metal reducing agent can be added as powder, chips, wire or other known forms. Other metal oxalates from impurities in the ilmenite ore such as $MnC_2O_4.2H_2O$ can co-precipitate with the iron oxalate.

In oxidative digestion, the digestion is carried out in an oxidative atmosphere such as air. The trimethylammonium hydrogen oxalate to ore molar ratio is 5:1 to 10:1 (on the basis of hydrogen in the trimethylammonium hydrogen oxalate to ilmenite ratio) for dissolution performed in air or other oxidative atmosphere. In this type of digestion, Fe(II) species are oxidized to Fe(III). The ferric ions produced upon digestion in air are more soluble in the solution than the ferrous ions and require additional steps to reduce and separate in order to form a titanium-rich solution for further processing. Oxidative digestion involves contacting ilmenite ore with aqueous trimethylammonium hydrogen oxalate in an oxidative atmosphere to form a solution rich in iron and titanium and a solid containing non-dissolvable material. Air can be added as over-pressure in an autoclave, for example, using a sparger. Insoluble components of the ore can include rutile, zircon, and/or quartz. After separating material that is not dissolved in the presence of air, the resulting solution is exposed to a reducing agent such as zinc metal under inert atmosphere to reduce the ferric ions to ferrous ions and to form an iron-rich precipitate.

In reductive digestion, the digestion is carried out in the presence of reducing agents such as iron, zinc, magnesium or aluminum metal particles added at the start of the digestion. In reductive digestion, substantially all ferrous ions are formed, leading to formation of an iron-rich precipitate which can be separated from the titanium-rich solution.

The product of the digestion, whether digestion is carried out in a single step or multiple steps, and regardless of whether the digestion is oxidative, non-oxidative, or reductive, is a titanium-rich solution and an iron-rich precipitate. The titanium-rich solution is separated from the iron-rich precipitate by conventional methods such as filtration and centrifugation. Sufficient trimethylammonium hydrogen oxalate can be added to give a saturated solution at hydrolysis temperatures (between 25° C. and 90° C.; preferably 75-90° C.).

After digestion, two pathways are available. The first pathway is to hydrothermally treat the titanium-rich solution in an autoclave at a temperature of 200° C. to 374° C. and at autogenous pressure for a time period of 1 h to 24 h. This treatment forms the desired titanium dioxide and a residual solution from which it can be separated by conventional methods such as filtration or centrifugation.

The hydrothermal treatment of the titanium-rich solution can result in the decomposition of the oxalate anion. If recycle of the oxalate, which can reduce the cost of the process, is desired, an alternative pathway may be used. In the alternative pathway, the titanium-rich solution is hydrolyzed with a base, preferably aqueous trimethylamine. The base, in the form of gas or aqueous solution, is added to the titanium-rich solution at a temperature of about 25° C. to about 90° C., preferably 75° C. to 90° C., in sufficient quantities to maximize the precipitation of the titanium component and minimize the precipitation of the iron component of the titanium-rich solution. This is generally monitored by pH. For example, if the hydrolysis is performed at room temperature (about 25° C.), the pH is preferably no higher than about 7.5. Higher pH can lead to the undesired precipitation of iron species, which can require extensive washing and bleaching with acid to remove. The product of the hydrolysis is a mixture containing a high oxalate content "titanyl hydroxide" solid and an oxalate-rich residual solution. The chemical identity of "titanyl hydroxide" is not precisely known, in part because the degree of hydration is variable. The "titanyl hydroxide" (titanic acid) is believed to exist as $TiO(OH)_2$, $TiO(OH)_2.H_2O$ or $TiO(OH)_2.nH_2O$ (where n>1) or mixtures thereof [see J. Barksdale, "Titanium: Its Occurrence, Chemistry and Technology", $2^{nd}$ Edition, Ronald Press; New York (1966)]. The mixture is allowed to stir for 1 or more hours and is then separated, preferably by hot filtering through a filter medium with pore size of approximately 4 µm-5.5 µm. Filtration rates of greater than about 12 mL/min are preferred. The titanyl hydroxide solids are then washed with a solution containing water, aqueous trimethylammonium oxalate and/or aqueous trimethylamine to displace any imbibed leachate and to reduce the concentration of undesired metals such as Fe. Although preferred quantities of process ingredients are set forth, one of skill in the art will recognize that the concentration can vary and the process will work for a variety of concentrations of the ingredients used in the process.

At this point in the process, there are again two potential pathways. In a first pathway, the titanyl hydroxide solid mixed with the residual solution is hydrothermally treated to form nano-titanium dioxide and a di-trimethylammonium oxalate solution. The hydrothermal treatment is carried out at a temperature of 250° C. or lower, for 1-to 24 hours. The di-trimethylammonium oxalate solution may be retained for recycle into trimethylammonium hydrogen oxalate to be used in further ore digestion at the front end of the process. Any of the digestion modes disclosed herein above may be used with this route to $TiO_2$. In a second, alternative pathway, the high oxalate containing titanyl hydroxide solids are repulped with water to form a slurry containing sufficient aqueous trimethylamine to raise the pH to about 9. The slurry is then heated and additional aqueous trimethylamine is added to keep the pH at about 9. In this step, any oxalate still associated with the titanium species is stripped away forming low oxalate titanyl hydroxide in the slurry. The slurry is then filtered and the low oxalate containing titanyl hydroxide solids washed with water to remove any remaining oxalate.

Titanium dioxide is known to exist in at least three crystalline mineral forms: anatase, rutile and brookite. Rutile crystallizes in the tetragonal crystal system (P42/mnm with a=4.582 Å, c=2.953 Å); anatase crystallizes in the tetragonal crystal system (I41/amd with a=3.7852 Å, c=9.5139 Å; brookite crystallizes in the orthorhombic crystal system (Pcab with a=5.4558 Å, b=9.1819 Å, c=5.1429 Å). Crystallization of titanium dioxide from the low oxalate-containing titanyl hydroxide solids can be accomplished by one of four crystallization processes: low temperature hydrothermal (150° C.-250° C.), high temperature hydrothermal (250° C.-374° C.), normal calcination (700° C.-1100° C.) or flux calcination. Crystallization can optionally involve addition of crystallization aids such as, for example, rutile seed, mineralizers, and rutile directors (e.g., Sn compounds). The higher temperature routes—both hydrothermal and calcination—can give rutile of the proper particle size to give the product the desired opacity for most applications. Titanium dioxide product in the particle size range 100 to 600 nanometers is desired for use as pigment. Titanium dioxide with a particle size less than 100 nanometers is referred to as nano-sized.

For normal calcination, the low oxalate containing titanyl hydroxide solids are heated at a temperature of about 800° C. to 1000° C. for a period of at least one hour. The solids can be heated in air or in an inert atmosphere. Conversion of low oxalate containing titanyl hydroxide solids into crystalline anatase form and rutile form can be influenced by process factors including, for example, temperature, time at temperature, temperature-time profile, amount of impurities, and additives that promote formation or stabilization of anatase, rutile or brookite. The same or other factors also affect the primary and secondary titania particle morphologies, e.g., size, shape, aggregation, and agglomeration, of the titania product.

The morphology of rutile made from low oxalate containing titanyl hydroxide solids can be changed by use of an additive such as a fluxing agent. Sodium chloride is an example of a fluxing agent. Addition of NaCl can modify the shape and size of the primary and secondary rutile particles. This is referred to as "flux calcination". In flux calcination, the titanium precipitate is heated to about 800° C. to 1000° C. for a period of at least 1 h in the presence of at least 1 wt % of a fluxing agent such as NaCl. Examples of other fluxing agents are KCl and LiCl. Addition of NaCl during calcination can provide a product containing larger primary particles having a more clearly defined shape.

In addition to being a particle size and shape control agent, NaCl can also serve as a structure-directing agent (rutile promoter). For example, in the absence of NaCl, leachate-derived titanium precipitate produces irregularly-shaped particles of anatase, both with and without additional particle-morphology modifiers (such as K and P), at 800° C. However, modifying the process conditions by addition of as little as about 1-5 wt % NaCl (the percent based on the weight of $TiO_2$ that can be obtained from the precipitate) produces a well-defined rutile particle product at 800° C. Sodium chloride, therefore, can be used with oxalate-derived titanium precipitate as a rutile promoter, a particle morphology control agent, and particle agglomeration control agent at 800° C. Other agents such as KCl and LiCl can also be used with oxalate-derived titanium precipitate as a rutile promoter, a particle morphology control agent, and particle agglomeration control agent at 800° C.

Low temperature hydrothermal crystallization (LTHC) involves conversion of the amorphous "titanyl hydroxide" intermediate to $TiO_2$ in the presence of water at relatively mild temperature conditions (from 150° C. to 250° C.) compared to the calcination temperatures (ca. 1000+° C.) typically utilized in current commercial $TiO_2$ production. Reaction temperatures in the LTHC process range from as low as 150° C. up to 250° C. with reaction pressures on the order of the corresponding vapor pressure of water and with reaction times of less than 24 hours. Variation within this range of conditions, control of the acid concentration in the reaction mixture, and the addition of phase-directing mineralizers can be utilized to selectively control the resulting $TiO_2$ particle size, crystallography, and morphology. For example, rutile $TiO_2$ of pigmentary size (100 nm-300 nm) can be formed at 220° C.-250° C. with the addition of a rutile-directing mineralizer (e.g., $ZnCl_2$, $ZnO$, $MgCl_2$, or NaCl). Nano-sized rutile $TiO_2$ can be produced under similar conditions, but at temperatures as low as 150° C. Operation at temperatures as low as 150° C. with anatase-directing mineralizers (e.g., $KH_2PO_4$, $Al_2(SO_4)_3$, $ZnSO_4$, and $Na_2SO_4$) produces anatase $TiO_2$. Brookite $TiO_2$ can be prepared at temperatures above 150° C., optionally with the addition of a brookite phase-directing mineralizer (e.g., $AlCl_3.6H_2O$, $\alpha$-$Al_2O_3$, and $Al(OH)_3$).

When high temperature hydrothermal crystallization is carried out in the temperature range of 250° C. to 374° C., the crystallization of $TiO_2$ particles is carried out hydrothermally in the presence of strong acids and various metal chloride mineralizers. Amorphous hydrous titanium oxide precipitate (sometimes represented as $TiO(OH)_2.nH_2O$ with n ~32) is added to water to produce a slurry typically in the 33-50 wt % range. The slurry can be acidified with strong mineral acids to give pH values typically in the 1-2 range. Alternatively, metal chloride salts can be added at levels ranging from 0.5 to 20% of the weight of the amorphous $TiO(OH)_2.nH_2O$. For example, rutile $TiO_2$ of pigmentary size (100 nm-300 nm) can be formed at 250° C.-374° C. with the addition of a rutile-directing mineralizer (e.g., $ZnCl_2$, $ZnO$, $MgCl_2$, or NaCl). The slurry is placed into gold reaction tubes, which are then crimped closed, rather than fully sealed, to allow for pressure equilibration. The gold tube with its contents is then placed into an autoclave. The temperature can range from 250° C. to 374° C. and the pressure is autogenous, typically ranging from 40 to 170 atm, respectively. The duration of the high temperature hydrothermal treatment is generally from 1 to 72 h.

Iron oxide can be produced from the iron-rich precipitates produced in the above described processes. The iron-rich precipitates are reacted with a base, preferably aqueous trimethylamine, in the presence of oxygen, to form an iron oxide/hydroxide and a di-trimethylammonium oxalate solution derived from the iron-rich precipitates. The iron oxides are then separated from the solution. Iron oxide may be used as a pigment or in the production of metallic iron. Alternatively, the iron(II)-rich precipitates can be oxidized by treatment in an oxalate solution to soluble iron(III) species that are subsequently hydrolyzed with aqueous trimethylamine to give an iron oxide/hydroxide precipitate and an a di-trimethylammonium oxalate solution. Alternatively, the iron-rich precipitates can be calcined or hydrothermally treated to form various iron oxide phases. These routes are described in "Iron Oxides in the Laboratory" by U. Schwertmann and R. M. Cornell, Wiley VCH, $2^{nd}$ Edition, Weinheim, 2003.

Trimethylammonium hydrogen oxalate can be recovered and recycled from di-trimethylammonium oxalate produced in various steps and embodiments of the processes. The recovered trimethylammonium hydrogen oxalate can be used for further ilmenite ore digestion. Aqeuous di-trimethylammonium oxalate is derived from processing of both iron-rich solutions and titanium-rich solutions. The aqueous di-trimethylammonium oxalate can be combined or processed independently. The di-trimethylammonium oxalate solutions are heated to remove trimethylamine with water from aqueous trimethylammonium hydrogen oxalate. The ability to recycle the oxalate-containing reagents and aqueous trimethylamine reduces the operating cost of the process.

EXAMPLES

Example 1

415.7 g $H_2C_2O_4 \cdot 2H_2O$ (Aldrich Catalog #247537) and 1005.4 g deionized water were combined in a 3 L round bottom flask equipped with a mechanical stirrer and condenser under a nitrogen blanket. A distillation arm was attached to the top of the condenser. A condenser and receiver were attached to the side arm. The receiver was filled with approx. 19 g deionized water and the pH was regularly checked during the experiment to determine whether any trimethylamine was escaping the flask during reaction. The oxalic acid dissolved rapidly once the temperature reached approx. 50° C. The mixture was stirred overnight at 60° C. To the mixture, 388.9 g of aqueous trimethylamine (50%, Acros) was added. The contents of the flask were brought to reflux at which point 195 g of ilmenite ore (Iluka Resources LTD, Capel, Australia) was added. The initial pH was about 3. Samples of leachate were collected at 6, 24, 48 and 120 h and were analyzed by Inductively Coupled Plasma Spectrometry for elemental composition. The results are given in Table 1.

TABLE 1

| Time (h) | [Fe] (ppm) | [Ti] (ppm) | Fe/Ti (molar ratio) |
|---|---|---|---|
| 6 | 8684 | 16312 | 0.456 |
| 24 | 10473 | 22044 | 0.407 |
| 48 | 11745 | 25144 | 0.400 |
| 120 | 14018 | 29751 | 0.404 |

Example 2

1241.2 g of the green-colored leachate solution (pH=1.59) from Example 1 was placed in a 2 L resin kettle equipped with a stir motor and condenser. The solution was heated to 83° C. under nitrogen atmosphere. A total of 17.6 g of iron powder was added. After reduction (as indicated by the formation of a blue colored precipitate when mixed with ammonium hydroxide), the solution was cooled and allowed to stir overnight. The final pH was 4.27. The mixture was filtered using a 0.45μ Nylon disposable filter funnel that was blanketed with nitrogen. From this process, 1120.2 g of a root beer colored solution were collected. ICP analysis showed 1670 ppm Fe and 32100 ppm Ti for a molar Fe/Ti ratio of 0.0448 compared to 0.404 for the starting leachate.

What is claimed is:

1. A process comprising:
   a) digesting ilmenite ore with aqueous trimethylammonium hydrogen oxalate to form a leachate and an iron-rich precipitate;
   b) separating said leachate from said iron-rich precipitate to form a separated leachate and a separated iron-rich precipitate;
   c) hydrolyzing said separated leachate with trimethylamine or aqueous trimethylamine to form titanyl hydroxide and an oxalate-rich solution;
   d) separating said titanyl hydroxide from said oxalate-rich solution to form a separated titanyl hydroxide;
   e) washing said separated titanyl hydroxide with a material selected from the group consisting of water, trimethylamine and aqueous trimethylamine to form washed titanyl hydroxide; and
   f) crystallizing titanium dioxide from said washed titanyl hydroxide.

2. The process of claim 1 further comprising adding a reducing agent to said separated leachate to form a reduced leachate and a second iron precipitate and separating said second iron precipitate from said reduced leachate to form a separated second iron precipitate and a separated reduced leachate.

3. The process of claim 1 further comprising:
   oxidizing said separated iron-rich precipitate in an acidic trimethylammonium hydrogen oxalate solution to form an trimethylammonium iron(III) oxalate solution;
   optionally, separating unreacted ore from said trimethylammonium iron(III) oxalate solution to form a separated trimethylammonium iron(III) oxalate solution;
   adding a base to said separated trimethylammonium iron (III) oxalate solution to form an iron-rich hydroxide precipitate and a di-trimethylammonium oxalate solution;
   separating said iron-rich hydroxide precipitate from said di-trimethylammonium oxalate solution to form a separated iron-rich hydroxide precipitate; and optionally, calcining said separated iron-rich hydroxide precipitate.

4. The process of claim 1, further comprising:
adding a base to said separated iron-rich precipitate to form an iron-rich hydroxide precipitate and a basic solution;
separating said iron-rich hydroxide precipitate from said basic solution to form a separated iron-rich hydroxide precipitate; and
optionally, calcining said separated iron-rich hydroxide precipitate.

5. The process of claim 1, further comprising calcining said separated iron-rich precipitate.

6. The process of claim 1, further comprising refluxing said di-trimethylammonium oxalate solution to obtain an aqueous trimethylamine distillate and an acidic trimethylammonium hydrogen oxalate solution.

7. A process comprising:
a) digesting ilmenite ore with aqueous trimethylammonium hydrogen oxalate to form a first leachate and an iron-rich precipitate;
b) separating said first leachate from said iron-rich precipitate to form a separated first leachate and a separated iron-rich precipitate;
c) optionally, adding a reducing agent to said separated first leachate to form a second iron-rich precipitate and a second leachate and separating said second iron-rich precipitate from said second leachate to form a separated second iron-rich precipitate and a separated second leachate;
d) hydrothermally crystallizing said separated first or second leachate in an autoclave for a period of one hour to 24 hours to form titanium dioxide and a hydrothermally treated solution; and
e) separating said titanium dioxide from said hydrothermally treated solution.

8. The process of claim 7 further comprising:
oxidizing said separated iron-rich precipitate in an acidic trimethylammonium oxalate solution to form a trimethylammonium iron(III) oxalate solution;
optionally, separating unreacted ore from said trimethylammonium iron(III) oxalate solution to form a separated trimethylammonium iron(III) oxalate solution;
adding a base to said separated trimethylammonium iron(III) oxalate solution to form an iron-rich hydroxide precipitate and a di-trimethylammonium oxalate solution;
separating said iron-rich hydroxide precipitate from said di-trimethylammonium oxalate solution to form a separated iron-rich hydroxide precipitate; and
optionally, calcining said separated iron-rich hydroxide precipitate.

9. The process of claim 7, further comprising:
adding a base to at least one of said separated iron-rich precipitate from (b) and said separated iron-rich precipitate from (c) to form an iron-rich hydroxide precipitate and a basic solution;
separating said at least one of said separated iron-rich precipitate from (b) and said separated iron-rich hydroxide precipitate from said basic solution to form a separated iron-rich hydroxide precipitate; and
optionally, calcining said separated iron-rich hydroxide precipitate.

10. The process of claim 7, further comprising calcining said separated iron-rich precipitate.

11. A process comprising:
a) digesting ilmenite ore with aqueous trimethylammonium hydrogen oxalate to form a leachate and an iron-rich precipitate;
b) separating said leachate from said iron-rich precipitate to form a separated leachate and a separated iron-rich precipitate; adding a reducing agent to said separated leachate to form a second iron-rich precipitate and a reduced leachate;
c) separating said second iron-rich precipitate from said reduced leachate of (b) to form a separated reduced leachate and a separated second iron-rich precipitate;
d) hydrolyzing said separated reduced leachate with aqueous trimethylamine to form titanyl hydroxide; and
e) hydrothermally crystallizing said titanyl hydroxide to form titanium dioxide and a di(trimethylammonium) oxalate solution.

12. The process of claim 11 further comprising:
oxidizing said separated second iron-rich precipitate of (c) in an acidic trimethylammonium oxalate solution to form a trimethylammonium iron(III) oxalate solution;
optionally, separating unreacted ore from said trimethylammonium iron(III) solution to form a separated trimethylammonium iron(III) oxalate solution;
adding a base to said separated trimethylammonium iron (III) oxalate solution to form an iron-rich hydroxide precipitate and an di-trimethylammonium oxalate solution;
separating said iron-rich hydroxide precipitate from said di-trimethylammonium oxalate solution to form a separated iron-rich hydroxide precipitate; and
optionally, calcining said separated iron-rich hydroxide precipitate.

13. The process of claim 11, further comprising:
adding a base to at least one of said separated iron-rich precipitate from (b) and said separated second iron-rich precipitate from (c) to form an iron-rich hydroxide precipitate and a basic solution;
separating said at least one of said separated iron-rich precipitate from (b) and said separated iron-rich hydroxide precipitate from said basic solution to form a separated iron-rich hydroxide precipitate; and
optionally, calcining said separated iron-rich hydroxide precipitate.

14. The process of claim 11, further comprising refluxing said di-trimethylammonium oxalate solution to obtain an aqueous trimethylamine distillate and an acidic trimethylammonium hydrogen oxalate solution.

15. The process of claim 11, further comprising calcining said separated iron-rich precipitate.

* * * * *